UNITED STATES PATENT OFFICE.

SUSIE ZAHNER, OF BATES, IDAHO.

PROCESS OF TREATING ANIMAL FATS.

1,123,644.     Specification of Letters Patent.     Patented Jan. 5, 1915.

No Drawing.     Application filed May 16, 1912. Serial No. 697,760.

*To all whom it may concern:*

Be it known that I, SUSIE ZAHNER, a Swiss citizen, residing at Bates, county of Fremont, and State of Idaho, have invented certain new and useful Improvements in Processes of Treating Animal Fats, of which the following is a specification.

This invention relates to processes of treating animal fats.

My process has for its object the improvement of the flavor of lard and the flavor and texture of tallow and other animal fats.

Fats that have previously been rendered may be treated by my process, or, the fat may be first cut into small pieces, as usual in any ordinary or common process of rendering lard or tallow preparatory to treating it with my process.

In carrying out my process, when approximately one half of the fat has been rendered, that is, when melted out of the cracklings, and when at a temperature of substantially 212° Fahrenheit or lower, I add new, unskimmed milk thereto in the proportion of one quart of milk to ten pounds of fat. Preferably, though not necessarily, the milk is added to the entire mass of rendered fat and cracklings but as the main feature of the invention is the addition of the milk to the fat to be rendered, I do not limit myself to its addition to the fat when the fat is in the same mass with the cracklings. Instead of adding milk as specified, the process may be carried out at this point and in the manner specified by the addition of from one-sixteenth quart to one quart of cream to every ten pounds of fat, or, enough milk to contain approximately from one-sixteenth quart to one quart of cream to every ten pounds of fat. My process also contemplates, instead of the addition of ordinary milk or cream, the addition of butter-milk whether contained in butter or separately, in the proportion above specified. Whether milk, cream, or butter-milk be added, the temperature of the fat being rendered should be not higher than 212° Fahrenheit and may be lower. The milk, cream or buttermilk may be added to any part or the entire mass and may be poured in rapidly, slowly, all at once, or in any desired manner.

In carrying out my process there may be added to the fat to be rendered any constituent, constituents or combination of constituents or parts of which milk is composed or consists while either the milk or the fat, or both, are, preferably, at a temperature of 212° Fahrenheit or less and the process contemplates the use of any ingredient of which milk constitutes a part. The fine flavor and improved texture being largely due to the cream in the milk, the proportion of the milk will vary according to its richness in cream. After the addition of the milk, cream, butter-milk, etc., as above specified, the entire mass is gradually heated, being stirred briskly meanwhile, until the fat begins to smoke. Thereupon, the heating and stirring may be continued until the mixture assumes a color and flavor according to the fancy of the consumer which governs the degree of heat and the period of time for carrying out this part of the process. The mixture should then be strained or pressed. On cooling, the strained or pressed product assumes a pure white color and is as palatable and soft as the best rendered sweet butter.

The bad qualities of inferior or spoiled fats, whether rendered or raw, can be very materially, if not entirely, corrected by my process.

Having thus described my invention, what I claim as new and desire to secure by Letters Patent, is:—

1. The process of treating fatty substances containing cracklings, consisting in melting out a part of the fat from the cracklings thereof, then adding a milk bearing element to the fat to be rendered, and finally straining or pressing the resulting product.

2. The process of treating fatty substances having cracklings, consisting in melting out approximately one-half of the fat from the cracklings thereof, then adding a milk-bearing element to the fat to be rendered in the proportion of one quart or less of the milk-bearing element to ten pounds of fat, and finally draining or pressing the product.

In testimony whereof, I hereunto affix my signature in presence of two witnesses.

SUSIE ZAHNER.

Witnesses:
JOHN MILLER,
JOS. KUNZ.